US012664807B2

(12) United States Patent
Kumar et al.

(10) Patent No.: US 12,664,807 B2
(45) Date of Patent: Jun. 23, 2026

(54) METHOD AND SYSTEM OF COMPARING DIGITAL LABELS

(71) Applicant: L&T TECHNOLOGY SERVICES LIMITED, Chennai (IN)

(72) Inventors: Pragyesh Kumar, Agra (IN); Tarun Kumar Das, Digboi (IN); Kalakonda Krishna Vamshi, Hyderabad (IN); Pavan Narasimha Murthy, Mysuru (IN); Mithillesh Kumar Putta, Chennai (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 249 days.

(21) Appl. No.: 18/648,573

(22) Filed: Apr. 29, 2024

(65) Prior Publication Data

US 2025/0201011 A1 Jun. 19, 2025

(30) Foreign Application Priority Data

Dec. 19, 2023 (IN) .............................. 202341087043

(51) Int. Cl.
| | |
|---|---|
| *G06V 30/224* | (2022.01) |
| *G06F 40/279* | (2020.01) |
| *G06V 10/25* | (2022.01) |
| *G06V 10/75* | (2022.01) |

(52) U.S. Cl.
CPC .......... *G06V 30/224* (2022.01); *G06F 40/279* (2020.01); *G06V 10/25* (2022.01); *G06V 10/759* (2022.01)

(58) Field of Classification Search
USPC ........................................................ 382/182
See application file for complete search history.

(56) References Cited

U.S. PATENT DOCUMENTS

| | | | |
|---|---|---|---|
| 9,292,565 B2 | 3/2016 | Bhagwan et al. | |
| 9,984,471 B2 * | 5/2018 | Becker ...................... | G06T 7/11 |
| 10,026,020 B2 * | 7/2018 | Jin .......................... | G06V 20/70 |
| 10,423,827 B1 * | 9/2019 | Wu ......................... | G06V 20/70 |
| 11,080,918 B2 * | 8/2021 | Chen ....................... | G06F 40/20 |
| 11,625,833 B2 | 4/2023 | Iyer et al. | |

(Continued)

OTHER PUBLICATIONS

Yingning Gao, Weisheng Liu; Complex Labels Text Detection AlgorithmBased on Improved YOLOv5; IAENG International Journal of Computer Science; Jun. 2023; vol. 50—Issue 2.

*Primary Examiner* — Ishrat I Sherali

(74) *Attorney, Agent, or Firm* — Kendal M. Sheets

(57) ABSTRACT

A method and system of comparing at least two digital labels is disclosed. A processor detects a set of regions of interest (ROIs) corresponding to a set of objects in each of the at least two digital labels using a first Machine Learning (ML)/Deep Learning (DL) model. Each of the set of objects are classified into one of a set of text objects or a set of non-text objects. One or more key-value pairs of one or more attributes are extracted from the text object. The one or more key-value pairs text data are compared corresponding to the text object of the at least two digital labels. The each of non-text object of the set of non-text objects are categorized into an object category from a set of object categories. An ROI of the each of non-text object of the set of non-text objects may be compared.

18 Claims, 15 Drawing Sheets

(56) References Cited

U.S. PATENT DOCUMENTS

| | | | |
|---|---|---|---|
| 11,631,233 B2 * | 4/2023 | Patel | G06V 10/225 |
| | | | 382/157 |
| 11,756,291 B2 * | 9/2023 | Turkelson | G06V 30/19173 |
| 11,810,383 B2 * | 11/2023 | Patel | G06N 20/00 |
| 12,182,703 B2 * | 12/2024 | Arroyo | G06V 10/82 |
| 2019/0080207 A1 * | 3/2019 | Chang | G06F 16/5838 |
| 2022/0114821 A1 * | 4/2022 | Arroyo | G06V 20/62 |
| 2022/0292258 A1 * | 9/2022 | Zeng | G06V 30/413 |
| 2025/0299507 A1 * | 9/2025 | Kumar | G06V 20/63 |

* cited by examiner

100

200

Computing Device 102

Boundary Detection Module 202

Object Detection Module 204

Object Classification Module 206

Object Decoding Module 208

Text Extraction Module 210

Address Extraction Module 212

Text Comparison Module 214

Non-Text Entity Categorization Module 216

ROI comparison Module 218

Output Report Generation Module 220

Figure 3A:
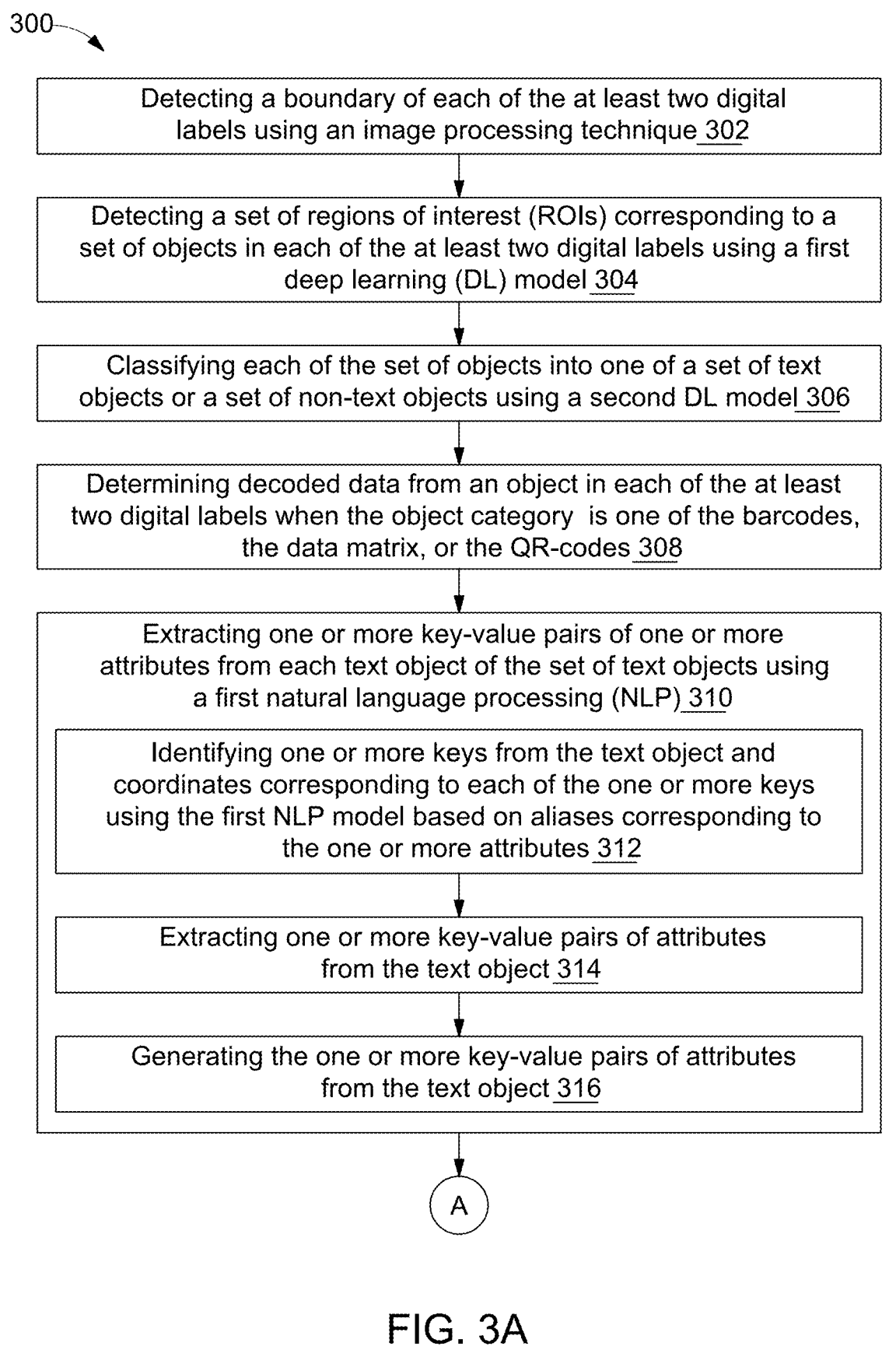

300

Detecting a boundary of each of the at least two digital
labels using an image processing technique 302

Detecting a set of regions of interest (ROIs) corresponding to a
set of objects in each of the at least two digital labels using a first
deep learning (DL) model 304

Classifying each of the set of objects into one of a set of text
objects or a set of non-text objects using a second DL model 306

Determining decoded data from an object in each of the at least
two digital labels when the object category is one of the barcodes,
the data matrix, or the QR-codes 308

Extracting one or more key-value pairs of one or more
attributes from each text object of the set of text objects using
a first natural language processing (NLP) 310

Identifying one or more keys from the text object and
coordinates corresponding to each of the one or more keys
using the first NLP model based on aliases corresponding to
the one or more attributes 312

Extracting one or more key-value pairs of attributes
from the text object 314

Generating the one or more key-value pairs of attributes
from the text object 316

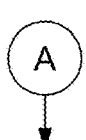

For each of the at least two digital labels:

Identifying address-associated non-text objects from the set of non-text objects 318

Extracting address-associated text objects from the set of text objects using a Named Entity Recognition (NER) model 320

Creating address-associated ROIs based on the masks using image processing techniques 322

Clustering address-associated ROIs based on the masks using image processing technique 324

Comparing address information from the address-associated ROIs using a third NLP model 326

Comparing the one or more key-value pairs and text data corresponding to each text object of the set of text objects of the at least two digital packaging labels using a second NLP model 328

Categorizing each of non-text object of the set of non-text objects into an object category from a set of object categories using a third ML/DL model 330

Comparing an ROI of each of non-text object of the set of non-text objects based on positional information and the object category in the at least two digital packaging labels 332

Generating an output report based on the comparison of the text data and the comparison of the ROI of each of the set of similar type of objects in the at least two digital packaging labels 334

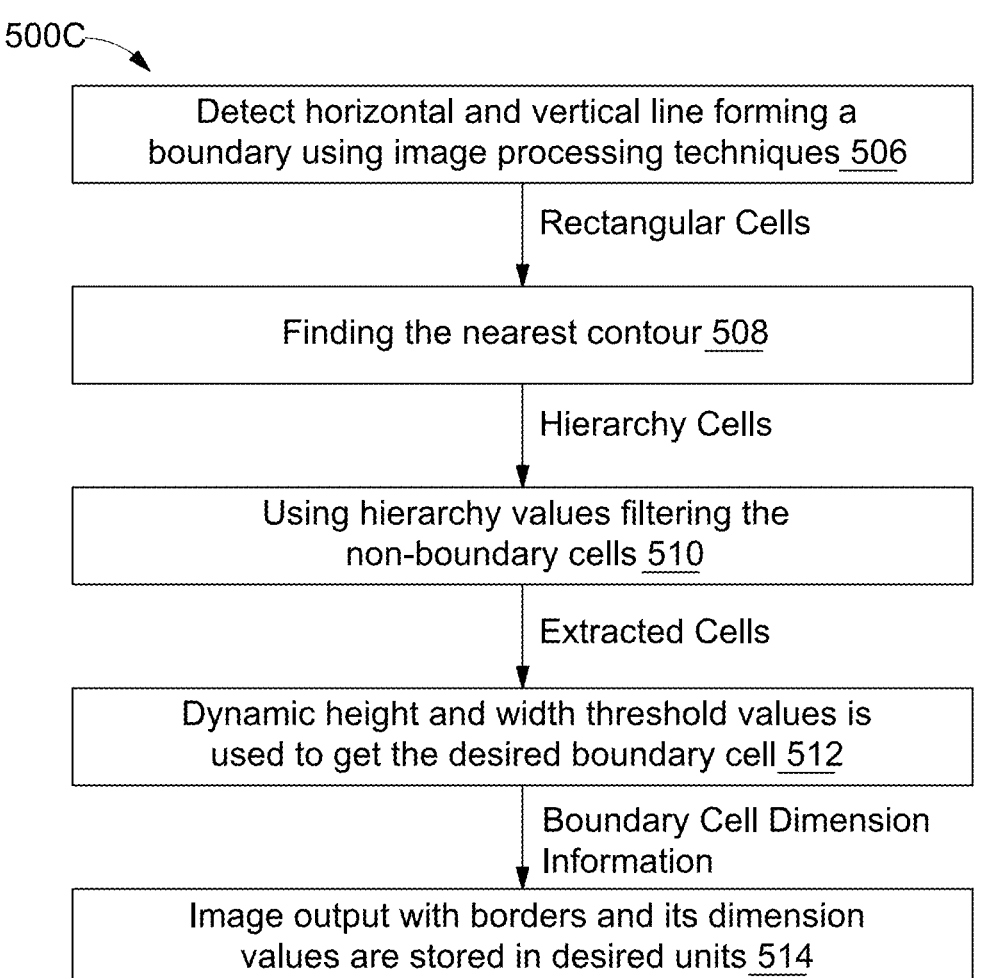

Detect horizontal and vertical line forming a boundary using image processing techniques 506

Rectangular Cells

Finding the nearest contour 508

Hierarchy Cells

Using hierarchy values filtering the non-boundary cells 510

Extracted Cells

Dynamic height and width threshold values is used to get the desired boundary cell 512

Boundary Cell Dimension Information

Image output with borders and its dimension values are stored in desired units 514

Data Collection 726

↓

Data Pre-processing 728

↓

Feature Engineering 730

↓

Data Splitting 732

↓

Model Selection 734

↓

Designing Model Architecture 736

↓

Model Compilation 738

↓

Model Training 740

↓

Model Evaluation 742

↓

Model Deployment 746

↓

Model Monitoring 748

↓

Hyper-parameter Tuning 744

800A

800B

1200A

1200B

METHOD AND SYSTEM OF COMPARING DIGITAL LABELS

TECHNICAL FIELD

This disclosure relates generally to object detection, text extraction information, and more particularly to a method and a system for comparing digital labels.

Background

In recent times, the significance of object detection techniques has surged. For example, the utilization of Deep Learning Based object detection techniques like YOLO, FasterRCNN, MaskRCNN, etc. presents the capability to identify objects within diverse document formats, spanning from images to Portable Document Format (PDF) files. These documents encompass multifaced data structures, may contain digital labels among other information. Within these labels, a spectrum of variations might exist, making the comparison between different iterations of individual digital labels a complex task. These iterations can encompass an array of elements, including symbols, logos, barcodes, QR codes, Data Matrix and textual data. The amalgamation of these diverse elements within the labels amplifies the challenge of effectively discerning and comparing the dissimilar versions of the digital labels.

Consider, for instance, a scenario where a repository of documents holds numerous iterations of digital labels, each with subtle modifications like altered symbols, updated logos, or revised textual information. The task of accurately distinguishing and contrasting these versions becomes complex due to the diverse amalgamation of elements within each label. Elements such as symbols, logos, barcodes, QR codes, Data Matrix and textual data add layers of complexity, demanding sophisticated detection techniques to efficiently navigate and discern differences among these digital labels. Consequently, the development and refinement of object detection methodologies, particularly within the domain of Computer Vision, has become increasingly pivotal to effectively handle and compare the complexities presented by diverse labels within documents.

Therefore, there is a requirement for an efficient methodology to compare digital labels in an accurate manner.

SUMMARY OF THE INVENTION

In an embodiment, a method of comparing at least two digital labels is disclosed. The method may include, detecting by a processor, a set of regions of interest (ROIs) corresponding to a set of objects in each of the at least two digital labels using a first Machine Learning (ML)/Deep Learning (DL) model. The method may further include classifying by the processor, each of the set of objects into one of a set of text objects or a set of non-text objects using a second ML/DL model. The method may further include extracting by the processor, one or more key-value pairs of one or more attributes from each text object of the set of text objects using a first Natural Language Processing (NLP) model. The method may further include comparing the one or more key-value pairs and text data corresponding to each text object of the set of text objects of the at least two digital labels using a second NLP model. The method may further include categorizing, by the processor, each of non-text object of the set of non-text objects into an object category from a set of object categories using a third ML/DL model. The method may further include comparing by the processor, an ROI of each of non-text object of the set of non-text objects based on positional information and the object category in the at least two digital labels. The method may further include generating by the processor, an output report based on the comparison of the text data and the comparison of the ROI of each of the set of similar type of objects in the at least two digital labels.

In another embodiment, a system of comparing at least two digital labels is disclosed. The system may include a processor, a memory communicably coupled to the processor, wherein the memory may store processor-executable instructions, which when executed by the processor may cause the processor to detect a set of regions of interest (ROIs) corresponding to a set of objects in each of the at least two digital labels using a first ML/(DL) model. The processor may use a second ML/DL model to classify each of the set of objects into one of a set of text objects or a set of non-text objects. The processor may use a first Natural language Processing (NLP) model to extract one or more key-value pairs of one or more attributes from each text object of the set of text objects. The processor may use a second NLP model to compare the one or more key-value pairs and text data corresponding to each text object of the set of text objects of the at least two digital labels. The processor may use a third ML/DL model to categorize each of non-text object of the set of non-text objects into an object category from a set of object categories. The processor may further compare an ROI of each of non-text object of the set of non-text objects based on positional information and the object category in the at least two digital labels. The processor may further generate an output report based on the comparison of the text data and the comparison of the ROI of each of the set of similar type of objects in the at least two digital labels.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A and FIG. 3B illustrate a flowchart of a method of comparing digital labels, in accordance with some embodiments of the present disclosure.

FIG. 5C is a flowchart of a method of detecting boundaries in digital labels, in accordance with an embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

Figure 1:
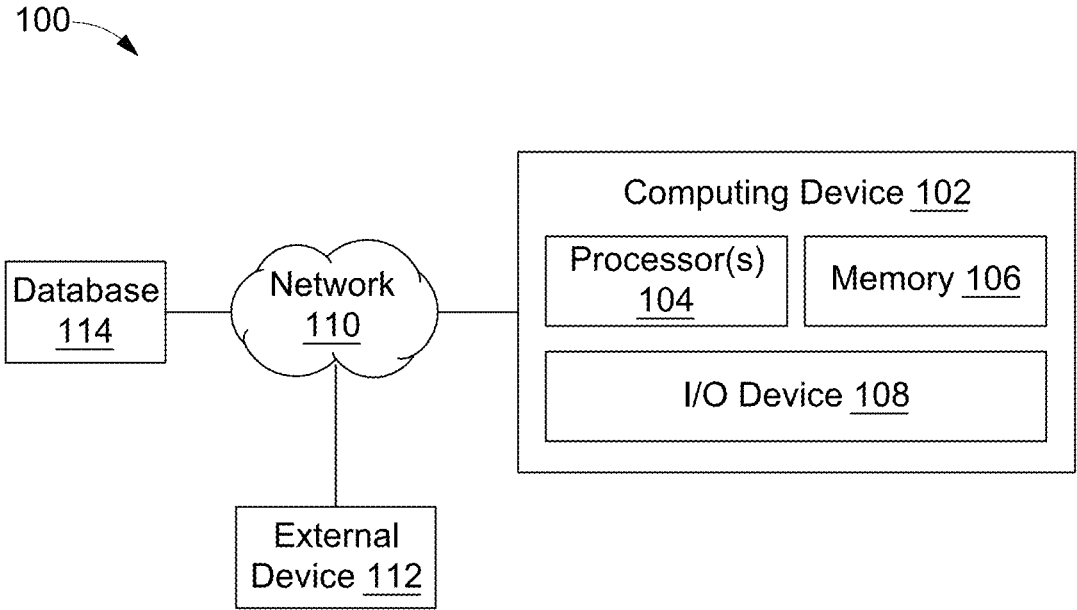
FIG. 1 illustrates a block diagram of an exemplary system for comparing digital labels, in accordance with some embodiments of the present disclosure.

Referring now to FIG. 1, a block diagram of an exemplary system 100 for comparing digital labels, in accordance with some embodiments of the present disclosure is illustrated. The system 100 may include a computing device 102, an external device 112, and a database 114 communicably connected to each other through a wired or wireless communication network 110. The computing device 102 may include a processor 104, a memory 106 and an input/output (I/O) device 108.

In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors.

In an embodiment, the memory 106 may store instructions that, when executed by the processor 104 may cause the processor 104 to compare at least two digital labels, as discussed in more detail below. In an embodiment, the memory 106 may be a non-volatile memory or a volatile memory. Examples of non-volatile memory may include but are not limited to, a flash memory, a Read Only Memory (ROM), a Programmable ROM (PROM), Erasable PROM (EPROM), and Electrically EPROM (EEPROM) memory. Further, examples of volatile memory may include but are not limited to, Dynamic Random Access Memory (DRAM), and Static Random-Access memory (SRAM).

In an embodiment, the I/O device 108 may comprise of variety of interface(s), for example, interfaces for data input and output devices, and the like. The I/O device 108 may facilitate inputting of instructions by a user communicating with the computing device 102. In an embodiment, the I/O device 108 may be wirelessly connected to the computing device 102 through wireless network interfaces such as Bluetooth®, infrared, or any other wireless radio communication known in the art. In an embodiment, the I/O device 108 may be connected to a communication pathway for one or more components of the computing device 102 to facilitate the transmission of inputted instructions and output results of data generated by various components such as, but not limited to, processor(s) 104 and memory 106.

In an embodiment, the database 114 may be enabled in a cloud or a physical database and may store digital labels. In an embodiment, the digital labels may include, but not limited to text data, symbols, logos barcodes, QR codes, and Data Matrix. In an embodiment, the database 114 may store data input by an external device 112 or output generated by the computing device 102. In an embodiment, the digital logos may be in any universal formats such as, but not limited to, JPEG, PNG, Portable Document Format (PDF), etc.

In an embodiment, the communication network 110 may be a wired or a wireless network or a combination thereof. The network 110 can be implemented as one of the different types of networks, such as but not limited to, ethernet IP network, intranet, local area network (LAN), wide area network (WAN), the internet, Wi-Fi, LTE network, CDMA network, 5G and the like. Further, network 110 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further network 110 can include a variety of network devices, including routers, bridges, servers, computing devices, storage devices, and the like.

In an embodiment, the computing device 102 may receive a request for comparing digital labels from the external device 112 through the network 110. In an embodiment, the computing device 102 and the external device 112 may be a computing system, including but not limited to, a smart phone, a laptop computer, a desktop computer, a notebook, a workstation, a portable computer, a personal digital assistant, a handheld, a scanner, or a mobile device. In an embodiment, the computing device 102 may be, but not limited to, in-built into the external device 112 or may be a standalone computing device.

In an embodiment, the computing device 102 may perform various processing for comparing the digital labels. By way of an example, the computing device 102 may receive at least two digital labels. Examples of the digital labels may include, but are not limited to, digital packaging labels, digital product labels, digital content labels, etc. The computing device 102 may detect a boundary of each of the at least two digital labels using an image processing technique. Further, the computing device 102 may detect a set of regions of interest (ROIs) corresponding to a set of objects in each of the at least two digital labels using a first Machine Learning (ML)/Deep learning (DL) model. The set of objects may include symbols, logos, barcodes, QR-codes, data matrix, and text data.

Further, the computing device 102 may classify each of the set of objects into one of a set of text objects or a set of non-text objects using a second ML/DL model. The computing device 102 may further determine decoded data from an object in each of the at least two digital labels when the object category may be one of the barcodes, the data matrix, or the QR-codes.

Further, the computing device 102 may extract one or more key-value pairs of one or more attributes from each text object of the set of text objects using a first Natural Language Processing (NLP) model. To extract the one or more key-value pairs, for each of the at least two digital labels, the computing device 102 may identify one or more keys from the text object and coordinates corresponding to each of the one or more keys in each of the at least two digital labels using the first NLP model based on aliases corresponding to the one or more attributes. Further, to extract the one or more key-value pairs, for each of the at least two digital labels, the computing device 102 may extract one or more values associated with the one or more keys using the first NLP model. Further, to extract the one or more key-value pairs, for each of the at least two digital labels, the computing device 102 may generate the one or more key-value pairs of attributes from the text object.

Further, the computing device 102 may identify address-associated non-text objects from the set of non-text objects. The computing device 102 may further extract address-associated text objects from the set of text objects using a Named Entity Recognition (NER) model. The address-associated text objects may be within a predefined threshold proximity to the address-associated non-text objects. The computing device 102 may further create masks corresponding to the address-associated text objects and address-associated non-text objects. The computing device 102 may further cluster address-associated ROIs based on the masks using image processing techniques. The computing device 102 may further extract address information from the address-associated ROIs using a third NLP model. Further, the computing device 102 may compare the one or more key-value pairs and text data corresponding to each text object of the set of text objects of the at least two digital labels using a second NLP model.

Further, the computing device 102 may categorize each non-text object of the set of non-text objects into an object category from a set of object categories using a third ML/DL model. The set of object categories may include symbols, logos, barcodes, data matrix, and QR-codes. Further, the computing device 102 may compare an ROI of each non-text object of the set of non-text objects based on positional information and the object category in the at least two digital labels. Further, the computing device 102 may generate an output report based on the comparison of the text data and the comparison of the ROI of each of the set of similar type of objects in the at least two digital labels.

Figure 2:
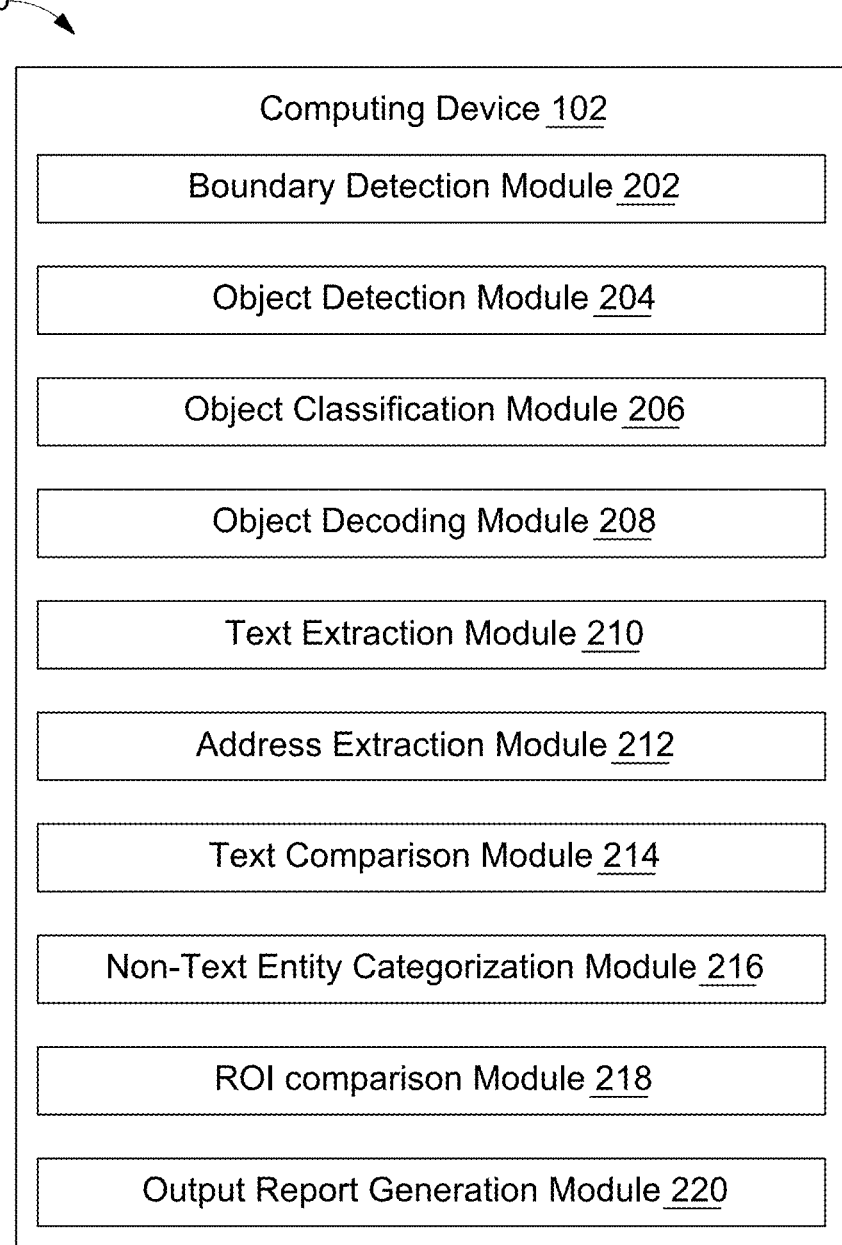
FIG. 2 illustrates a functional block diagram of a computing device, in accordance with some embodiments of the present disclosure.

Referring now to FIG. 2, a functional block diagram of a computing device 102, in accordance with some embodiments of the present disclosure. In an embodiment, the computing device 102 may include a boundary detection module 202, an object detection module 204, an object classification module 206, an object decoding module 208, a text extraction module 210, an address extraction module 212, a text comparison module 214, a non-text entity categorization module 216, an ROI comparison module 218, and an output report generation module 220.

The computing device 102 may receive at least two digital labels. Examples of the digital labels may be but is not limited to digital packaging labels, digital product labels, digital content labels, etc. The boundary detection module 202 may detect a boundary of each of the at least two digital labels using an image processing technique.

Further, the object detection module 204 may detect a set of regions of interest (ROIs) corresponding to a set of objects in each of the at least two digital labels using a first Machine Learning (ML)/Deep learning (DL) model. The set of objects may include symbols, logos, barcodes, QR-codes, data matrix, and text data.

The object classification module 206 may classify each of the set of objects into one of a set of text objects or a set of non-text objects using a second ML/DL model. The object decoding module 208 may further determine decoded data from an object in each of the at least two digital labels when the object category may be one of the barcodes, the data matrix, or the QR-codes.

Further, the text extraction module 210 may extract one or more key-value pairs of one or more attributes from each text object of the set of text objects using a first Natural Language Processing (NLP) model. The extraction of one or more key-value pairs may include the text extraction module 210 may identify one or more keys from the text object and coordinates corresponding to each of the one or more keys in each of the at least two digital labels using the first NLP model based on aliases corresponding to the one or more attributes. The extraction of one or more key-value pairs may further include the text extraction module 210 may extract one or more values associated with the one or more keys using the first NLP model. The extraction of one or more key-value pairs may further include the text extraction module 210 may generate the one or more key-value pairs of attributes from the text object.

Further, the address extraction module 212 may identify address-associated non-text objects from the set of non-text objects. The address extraction module 212 may further extract address-associated text objects from the set of text objects using a Named Entity Recognition (NER) model. The address-associated text objects may be within a predefined threshold proximity to the address-associated non-text objects. The address extraction module 212 may further create masks corresponding to the address-associated text objects and address-associated non-text objects. The address extraction module 212 may further cluster address-associated ROIs based on the masks using image processing techniques. The address extraction module 212 may further extract address information from the address-associated ROIs using a third NLP model.

Further, the text comparison module 214 may compare the one or more key-value pairs and text data corresponding to each text object of the set of text objects of the at least two digital labels using a second NLP model.

Further, the non-text entity categorization module 216 may categorize each non-text object of the set of non-text objects into an object category from a set of object categories using a third ML/DL model. The set of object categories may include symbols, logos, barcodes, data matrix, and QR-codes. Further, the ROI comparison module 218 may compare an ROI of each non-text object of the set of non-text objects based on positional information and the object category in the at least two digital labels.

Further, the output report generation module 220 may generate an output report based on the comparison of the text data and the comparison of the ROI of each of the set of similar type of objects in the at least two digital labels.

It should be noted that all such aforementioned modules 202-220 may be represented as a single module or a combination of different modules. Further, as will be appreciated by those skilled in the art, each of the modules 202-220 may reside, in whole or in parts, on one device or multiple devices in communication with each other. In some embodiments, each of the modules 202-220 may be implemented as dedicated hardware circuit comprising custom application-specific integrated circuit (ASIC) or gate arrays, off-the-shelf semiconductors such as logic chips, transistors, or other discrete components. Each of the modules 202-220 may also be implemented in a programmable hardware device such as a field programmable gate array (FGPA), programmable array logic, programmable logic device, and so forth. Alternatively, each of the modules 202-220 may be implemented in software for execution by various types of processors (e.g. processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for comparing digital labels. For example, the exemplary system 100 and the associated computing device 102 may compare digital labels by the processes discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Referring to FIG. 3A and FIG. 3B, a flowchart of a method 300 of comparing digital labels, in accordance with some embodiments of the present disclosure is illustrated. In an embodiment, method 300 may include a plurality of steps that may be performed by the processor 104 to compare digital labels.

FIG. 3A and FIG. 3B are explained in conjunction with FIGS. 1 and 2. Each step of the method 300 may be executed by various modules, same as the modules of the computing device 102.

At step 302, a boundary may be detected for each of the at least two digital labels using an image processing technique.

Further, at step 304, a set of regions of interest (ROIs) may be detected corresponding to a set of objects in each of the at least two digital labels using a first deep learning (DL) model. The set of objects may include symbols, logos, barcodes, QR-codes, data matrix, and text data.

Further, at step 306, each of the set of objects may be classified into one of a set of text objects or a set of non-text objects using a second DL model.

Further, at step 308, decoded data may be determined from an object in each of the at least two digital labels when the object category may be one of the barcodes, the data matrix, or the QR-codes.

Further, at step 310, one or more key-value pairs of one or more attributes may be extracted from each text object of the set of text objects using a first natural language processing (NLP) model. The extraction of one or more key-value pairs may include at step 312, one or more keys may be identified from the text object and coordinates corresponding to each of the one or more keys in each of the at least two digital labels using the first NLP model based on aliases corresponding to the one or more attributes. The extraction of one or more key-value pairs may further include at step 314, one or more values associated with the one or more keys may be extracted using the first NLP model. The extraction of one or more key-value pairs may further include at step 316, the one or more key-value pairs of attributes may be generated from the text object.

Further at step 318, address-associated non-text objects may be identified from the set of non-text objects. Further at step 320, address-associated text objects may be extracted from the set of text objects using a Named Entity Recognition (NER) model. The address-associated text objects may be within a predefined threshold proximity to the address-associated non-text objects. Further at step 322, masks corresponding to the address-associated text objects and address-associated non-text objects may be created using image processing techniques. Further at step 324, Address-associated ROIs may be clustered based on the masks using image processing techniques. Further at step 326, address information may be compared from the address-associated ROIs using a third NLP model. Further at step 328, the one or more key-value pairs and text data corresponding to each text object of the set of text objects of the at least two digital labels may be compared using a second NLP model.

Further at step 330, each of non-text object of the set of non-text objects may be categorized into an object category from a set of object categories using a third ML/DL model. The set of object categories may include symbols, logos, barcodes, data matrix, and QR-codes.

Further at step 332, an ROI of each non-text object of the set of non-text objects may be compared based on positional information and the object category in the at least two digital labels.

Further at step 334, an output report may be generated based on the comparison of the text data and the comparison of the ROI of each of the set of similar type of objects in the at least two digital labels.

Figure 4A:
FIG. 4A is an exemplary first digital label, in accordance with an embodiment of the present disclosure.
Figure 4B:
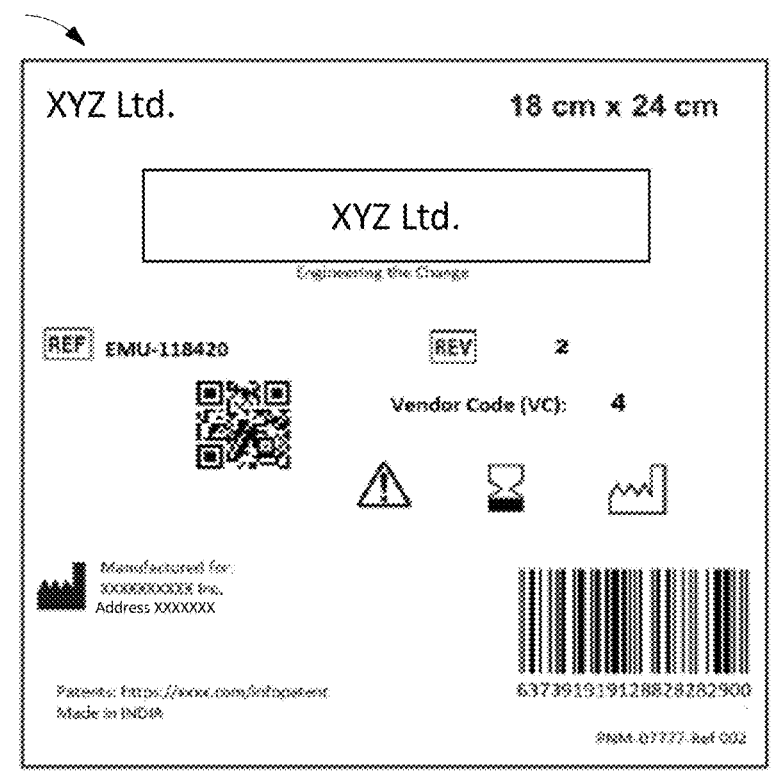
FIG. 4B is an exemplary second digital label, in accordance with an embodiment of the present disclosure.

Referring now to FIG. 4A, a first digital label 400A, in accordance with an embodiment of the present disclosure is illustrated. FIG. 4A is explained in conjunction with FIGS. 1 and 2. The first digital label 400A may be a digital packaging label. Referring now to FIG. 4B, a second digital label 400B, in accordance with an embodiment of the present disclosure is illustrated. FIG. 4B is explained in conjunction with FIGS. 1 and 2. The second digital label 400B may be a digital packaging label.

Figure 5A:
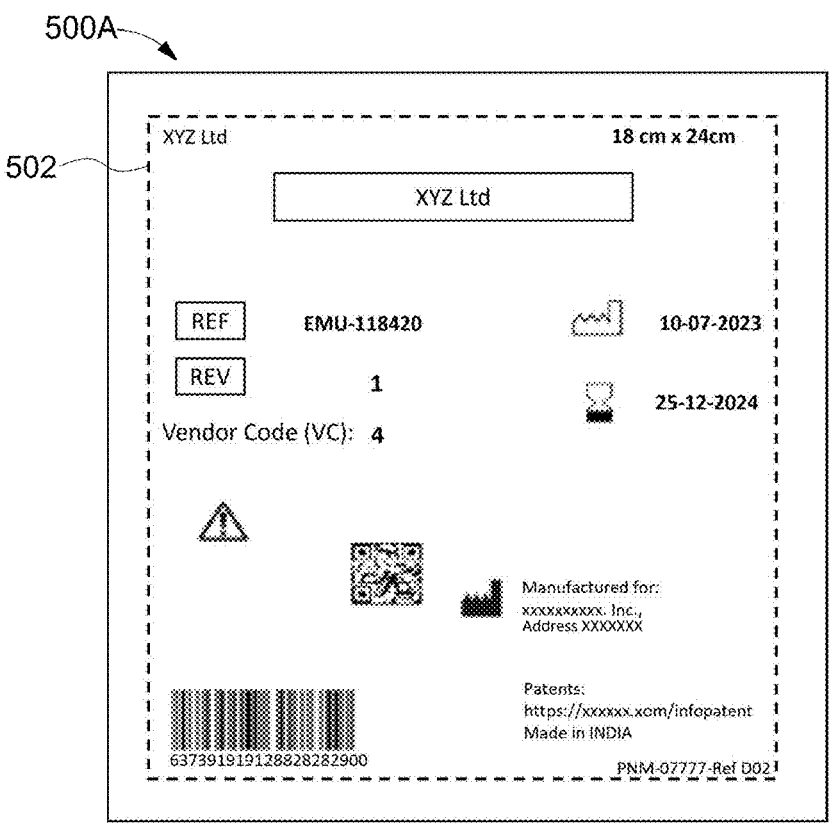
FIG. 5A is an exemplary first digital label with boundary detection, in accordance with an embodiment of the present disclosure.

Referring now to FIG. 5A, a first digital label 500A with boundary detection, in accordance with an embodiment of the present disclosure is illustrated. FIG. 5A is explained in conjunction with FIGS. 1 and 2. The first digital label 500A may include a boundary 502 detected in the second digital label 400A using an image processing technique.

Table 1 provided below illustrates an exemplary coordinate of the boundary 502 of the first digital label 500A.

TABLE 1

| x_in_pix | y_in_pix | w_in_pix | h_in_pix | x_in_mm | y_in_mm | w_in_mm | h_in_mm |
|---|---|---|---|---|---|---|---|
| 218 | 168 | 1220 | 1220 | 18 | 14 | 103 | 103 |

It should be noted that [x, y, w, h] represents bounding box coordinates of the boundary 502. The Table 1 presents each of the bounding box coordinates in pixels and millimeters (mm).

Figure 5B:
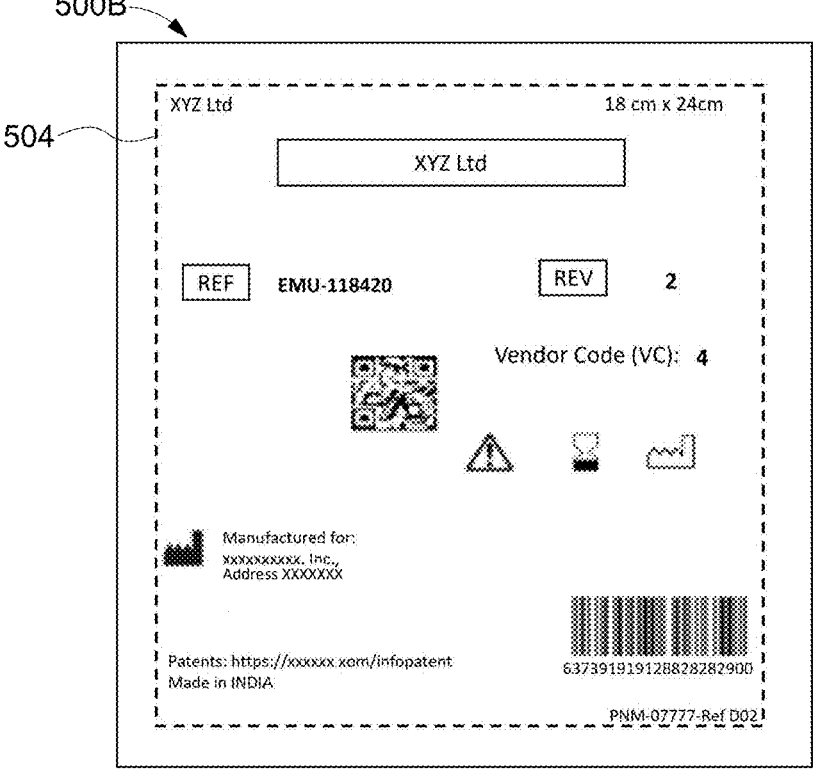
FIG. 5B is an exemplary second digital label with boundary detection, in accordance with an embodiment of the present disclosure.

Referring now to FIG. 5B, a second digital label 500B with boundary detection, in accordance with an embodiment of the present disclosure is illustrated. FIG. 5B is explained in conjunction with FIGS. 1 and 2. The second digital label 500B may include a boundary 504 detected in the second digital label 400B using the image processing technique.

Table 2 provided below illustrates an exemplary coordinate of the boundary 504 of the second digital label 500B.

TABLE 2

| x_in_pix | y_in_pix | w_in_pix | h_in_pix | x_in_mm | y_in_mm | w_in_mm | h_in_mm |
|---|---|---|---|---|---|---|---|
| 218 | 168 | 1220 | 1220 | 18 | 14 | 103 | 103 |

It should be noted that [x, y, w, h] represents bounding box coordinates of the boundary 504. The Table 2 presents each of the bounding box coordinates in pixels and millimeters (mm).

Referring now to FIG. 5C, a flowchart of a method 500C of detecting boundaries in digital labels, in accordance with an embodiment of the present disclosure is illustrated. In an embodiment, method 500C may include a plurality of steps that may be performed by the processor 104 to detect boundaries 502, 504 of at least two digital labels 500A and 500B.

FIG. 5C is explained in conjunction with FIGS. 1 and 2. Each step of the method 500C may be executed by boundary detection module 202, same as the module of the computing device 102.

At step 506, horizontal and vertical lines may be detected that may form a boundary using an image processing technique.

Further at step 508, hierarchy array list values may be determined based on a nearest contour.

Further at step 510, non-boundary cells may be filtered based on the hierarchy array list values.

Further at step 512, boundary cells may be determined based on dynamic height and width threshold values.

Further at step 514, image with borders and its dimension values may be outputted.

Figure 6A:
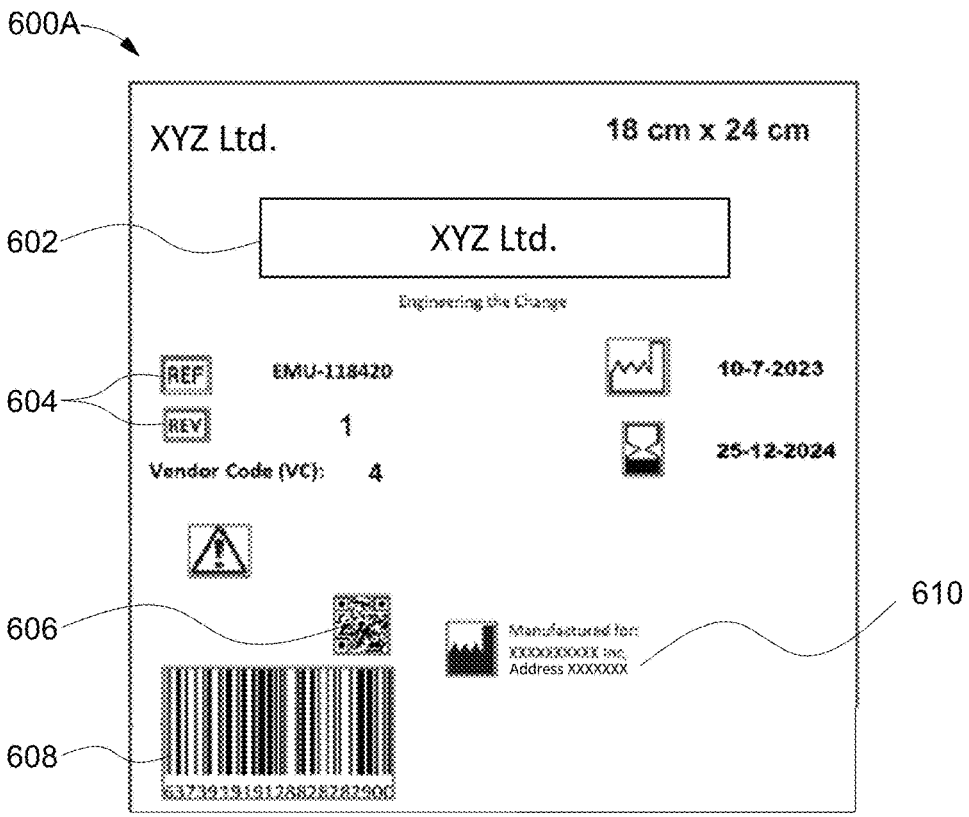
FIG. 6A is an exemplary first digital label with object detection, in accordance with an embodiment of the present disclosure.

Referring now to FIG. 6A, a first digital label 600A with object detection, in accordance with an embodiment of the present disclosure is illustrated. FIG. 6A is explained in conjunction with FIGS. 1 and 2. The first digital label 600A may include a first set of objects. The first set of objects may further include logos 602, symbols 604, QR-codes or data matrix 606, barcodes 608, and text data 610.

Table 3 provided below illustrates an exemplary coordinate of the first set of objects.

TABLE 3

| | x1 | y1 | x2 | y2 | Object Type |
|---|---|---|---|---|---|
| 0 | 320 | 900 | 476 | 994 | SYMBOLS |
| 1 | 276 | 1133 | 664 | 1360 | BARCODE |
| 2 | 620 | 885 | 754 | 1019 | DATAMATRIX/QR-CODE |
| 3 | 1010 | 593 | 1122 | 695 | SYMBOLS |

TABLE 3-continued

| | x1 | y1 | x2 | y2 | Object Type |
|---|---|---|---|---|---|
| 4 | 279 | 709 | 361 | 771 | SYMBOLS |
| 5 | 744 | 1057 | 835 | 1155 | SYMBOLS |
| 6 | 443 | 369 | 1203 | 498 | LOGO |
| 7 | 275 | 621 | 367 | 694 | SYMBOLS |
| 8 | 1036 | 731 | 1111 | 828 | SYMBOLS |
| 9 | 238 | 175 | 644 | 325 | LOGO |

Figure 6B:
FIG. 6B is an exemplary second digital label with object detection, in accordance with an embodiment of the present disclosure.

Referring now to FIG. 6B, a second digital label 600B with object detection, in accordance with an embodiment of the present disclosure is illustrated. FIG. 6B is explained in conjunction with FIGS. 1 and 2. The second digital label 600B may include a second set of objects. The second set of objects may further include logos 612, symbols 614, QR-codes or data matrix 616, and text data 618, barcodes or 620.

Table 4 provided below illustrates an exemplary coordinate of the second set of objects.

TABLE 4

| | x1 | y1 | x2 | y2 | Object Type |
|---|---|---|---|---|---|
| 0 | 354 | 725 | 518 | 896 | DATAMATRIX/QR-CODE |
| 1 | 1020 | 1037 | 1419 | 1264 | BARCODE |
| 2 | 1163 | 855 | 1280 | 957 | SYMBOLS |
| 3 | 757 | 851 | 865 | 947 | SYMBOLS |
| 4 | 969 | 855 | 1047 | 953 | SYMBOLS |
| 5 | 878 | 626 | 969 | 699 | SYMBOLS |
| 6 | 447 | 386 | 1215 | 517 | LOGO |
| 7 | 255 | 623 | 347 | 696 | SYMBOLS |
| 8 | 246 | 1020 | 337 | 1118 | SYMBOLS |
| 9 | 245 | 180 | 654 | 353 | LOGO |

Figure 6C:
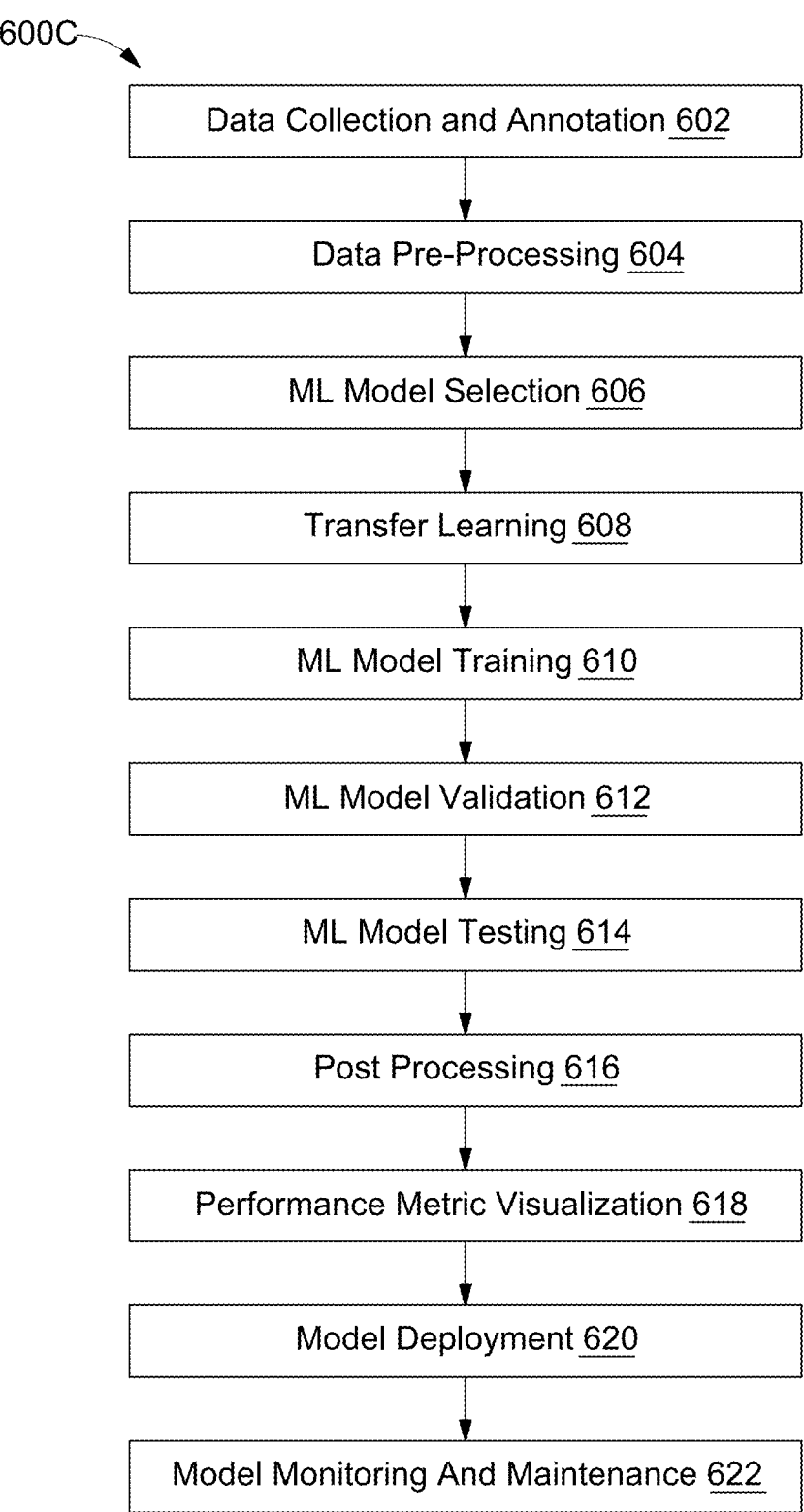
FIG. 6C is a flowchart of a method of detecting objects in digital labels, in accordance with an embodiment of the present disclosure.

Referring now to FIG. 6C, a flowchart of a method 600C of detecting objects in digital labels, in accordance with an embodiment of the present disclosure. In an embodiment, method 600C may include a plurality of steps that may be performed by the processor 104 to detect objects in at least two digital labels 600A and 600B.

FIG. 6C is explained in conjunction with FIGS. 1 and 2. Each step of the method 600C may be executed by the object detection module 204, same as the module of the computing device 102.

At step 602, a set of objects may be collected and annotated.

Further, at step 604, the set of objects may be pre-processed.

Further, at step 606, a machine learning model may be selected.

Further, at step 608, transfer learning technique may be applied.

Further, at step 610, the machine learning model may be trained.

Further, at step 612, the machine learning model may be validated.

Further, at step 614, the machine learning model may be tested.

Further, at step 616, the set of objects may be post-processed.

Further, at step 618, the set of objects may be visualized.

Further, at step 620, the machine learning model may be deployed.

Further, at step 622, the machine learning model may be monitored and maintained.

Figure 7A:
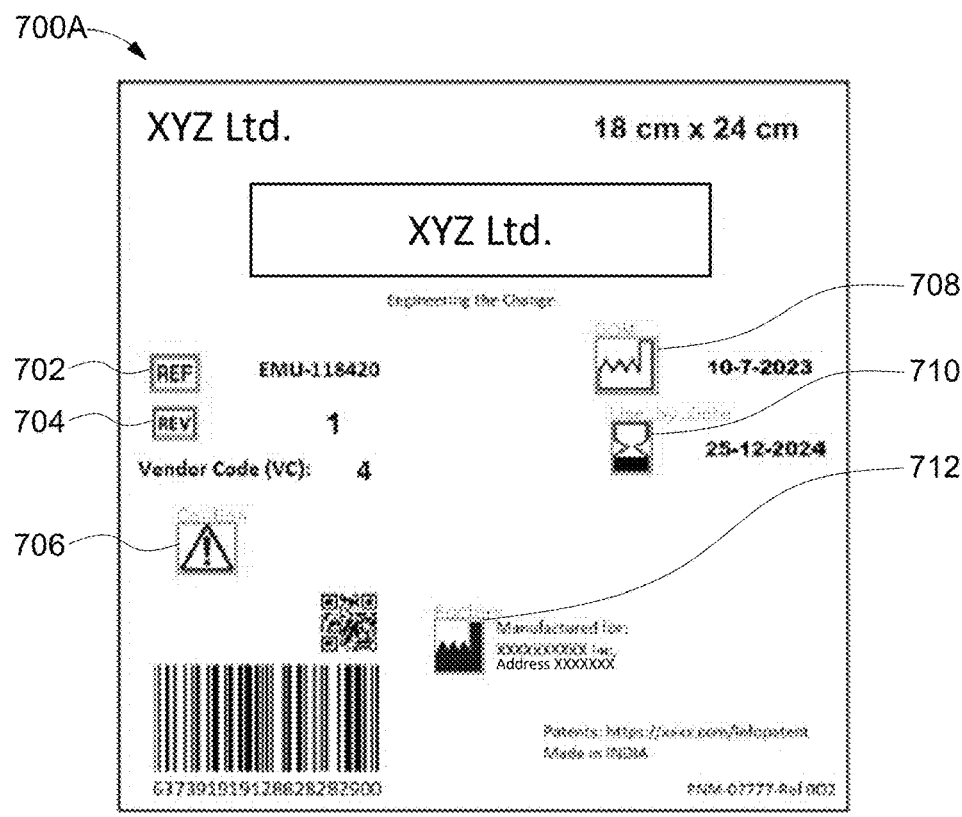
FIG. 7A is an exemplary first digital label with categorized symbols, in accordance with an embodiment of the present disclosure.

Referring now to FIG. 7A, a first digital label 700A with categorized symbols, in accordance with some embodiment of the present disclosure is illustrated. FIG. 7A is explained in conjunction with FIGS. 1 and 2. The first digital label 700A may include symbols 702, 704, 706, 708, 710, and 712. Further, the symbols 702, 704, 706, 708, 710, and 712 may be categorized into a symbol category from a set of symbol category.

Table 5 provided below illustrates an exemplary categorization of the symbols 702, 704, 706, 708, and 710.

TABLE 5

|   | x1 | y1 | x2 | y2 | TYPE | SYMBOL_NAME |
|---|----|----|----|----|------|-------------|
| 0 | 325 | 905 | 421 | 989 | SYMBOLS | Caution |
| 1 | 1015 | 598 | 1117 | 690 | SYMBOLS | DOM |
| 2 | 284 | 713 | 356 | 766 | SYMBOLS | Textual_Symbols |
| 3 | 749 | 1063 | 830 | 1150 | SYMBOLS | Factory |
| 4 | 280 | 626 | 360 | 688 | SYMBOLS | Textual_Symbols |
| 5 | 1041 | 736 | 1106 | 823 | SYMBOLS | Use_by_Date |

Figure 7B:
FIG. 7B is an exemplary second digital label with categorized symbols, in accordance with an embodiment of the present disclosure.

Referring now to FIG. 7B, a second digital label 700B with categorized symbols, in accordance with some embodiment of the present disclosure. FIG. 7B is explained in conjunction with FIGS. 1 and 2. The second digital label 700B may include symbols 714, 716, 718, 720, 722, and 724. Further, the symbols 714, 716, 718, 720, 722, and 724 may be categorized into a symbol category from a set of symbol category.

Table 6 provided below illustrates an exemplary categorization of the symbols 714, 716, 718, 720, 722, and 724.

TABLE 6

|   | x1 | y1 | x2 | y2 | TYPE | SYMBOL_NAME |
|---|----|----|----|----|------|-------------|
| 0 | 1169 | 860 | 1271 | 952 | SYMBOLS | DOM |
| 1 | 763 | 856 | 859 | 940 | SYMBOLS | Caution |
| 2 | 883 | 631 | 964 | 694 | SYMBOLS | Textual_Symbols |
| 3 | 260 | 628 | 342 | 691 | SYMBOLS | Textual_Symbols |
| 4 | 251 | 1025 | 332 | 1114 | SYMBOLS | Factory |
| 5 | 977 | 864 | 1039 | 944 | SYMBOLS | Use_by_Date |

Figure 7C:
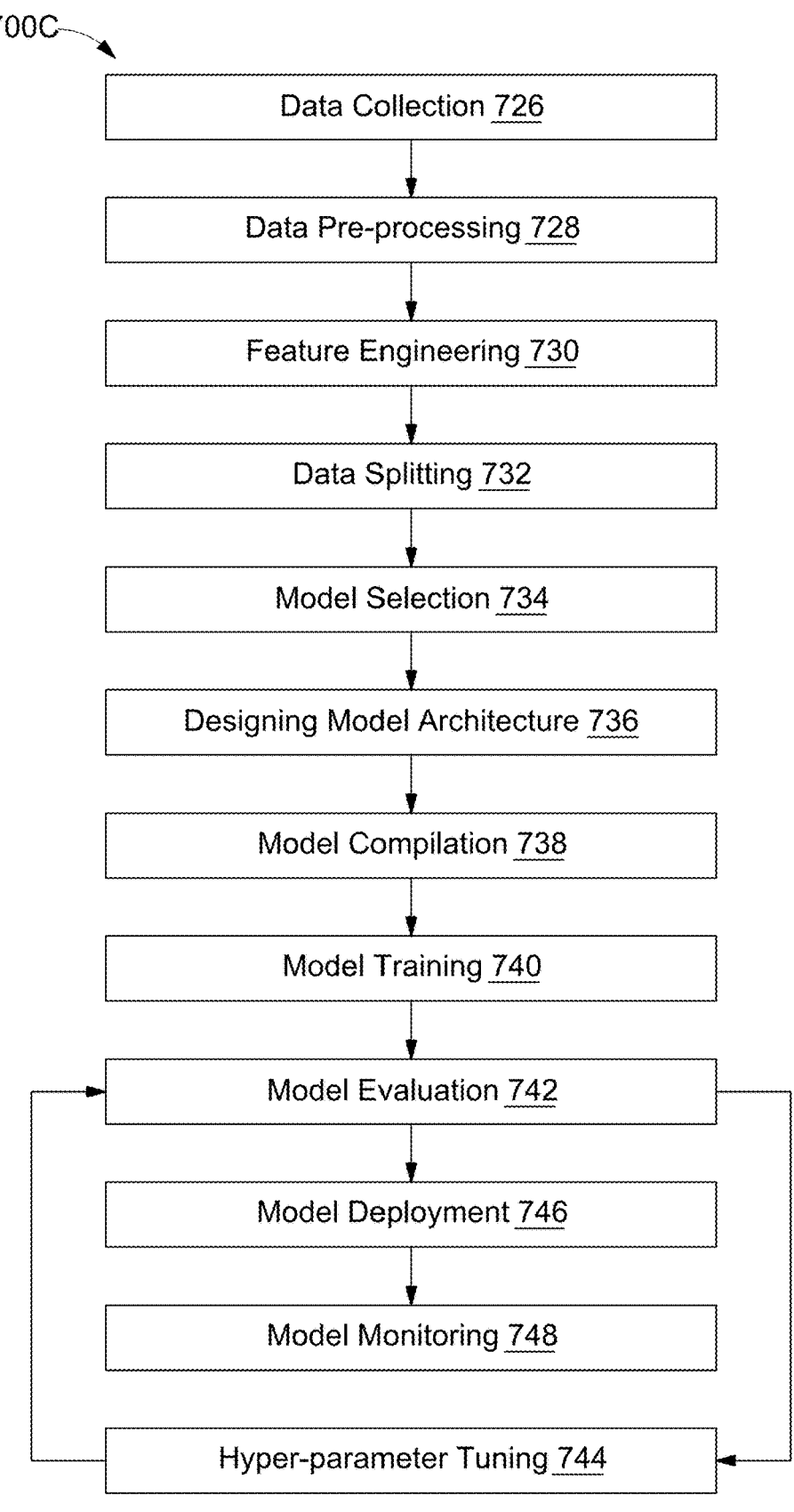
FIG. 7C is a flowchart of a method of categorizing symbols in digital labels, in accordance with an embodiment of the present disclosure.

Referring now to FIG. 7C, a flowchart of a method 700C of categorizing symbols in digital labels, in accordance with an embodiment of the present disclosure is illustrated. In an embodiment, method 700C may include a plurality of steps that may be performed by the processor 104 to categorize symbols in at least two digital labels 700A and 700B.

FIG. 7C is explained in conjunction with FIGS. 1 and 2. Each step of method 700C may be executed by the object classification module 206, same as the module of the computing device 102.

At step 726, symbols may be collected.

Further, at step 728, the symbols may be pre-processed.

Further, at step 730, features of the symbols may be determined.

Further, at step 732, the dataset of symbols may be split.

Further, at step 734, a model may be selected.

Further, at step 736, the designing of model architecture.

Further, at step 738, the model may be compiled.

Further, at step 740, the model may be trained.

Further, at step 742, the model may be evaluated.

Further, at step 744, the model may be hyper-tuned based on the evaluation.

Further, at step 746, the model m deployed.

Further, at step 748, the model may be monitored.

Table 7 provided below illustrates an exemplary comparison of the symbols 702, 704, 706, 708, 710, and 712 and the symbols 714, 716, 718, 720, 722, and 724.

TABLE 7

| x1 | y1 | x2 | y2 | TYPE | SYMBOL_NAME | LOCATION STATUS | SIZE_STATUS |
|----|----|----|----|------|-------------|-----------------|-------------|
| 325 | 905 | 421 | 989 | SYMBOLS | Caution | Location UnMatching | Size Not Changed |
| 1015 | 598 | 1117 | 690 | SYMBOLS | DOM | Location UnMatching | Size Not Changed |
| 749 | 1063 | 830 | 1150 | SYMBOLS | Factory | Location UnMatching | Size Not Changed |
| 1041 | 736 | 1106 | 823 | SYMBOLS | Use_by_Date | Location UnMatching | Size Changed |

Figure 8A:
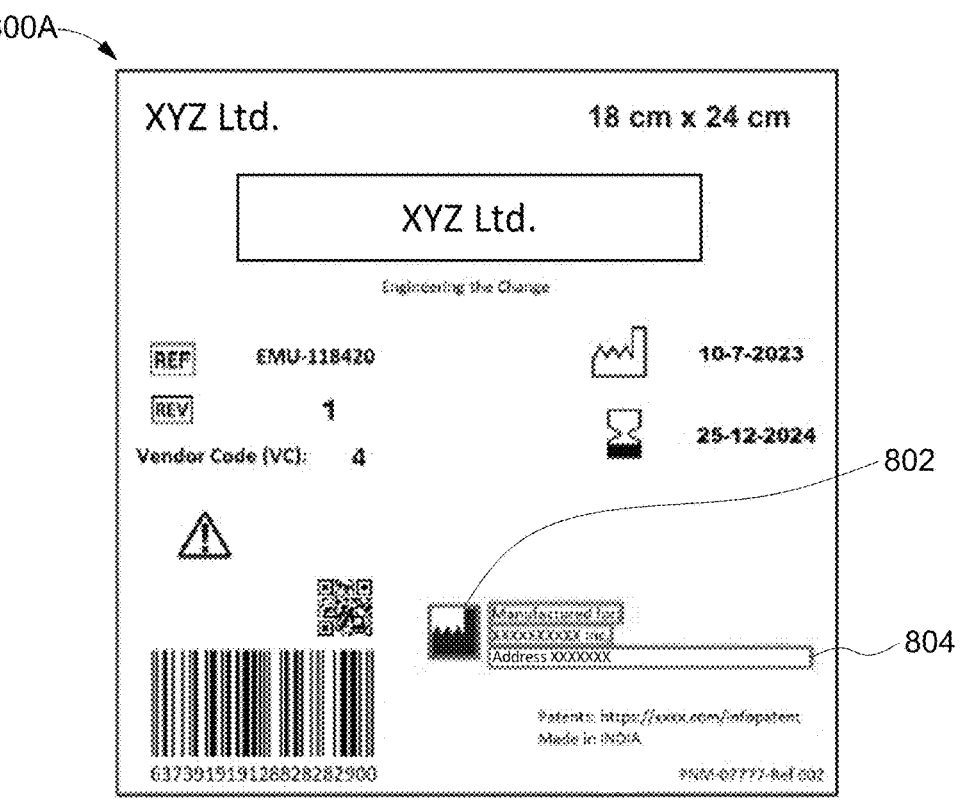
FIG. 8A is an exemplary first digital label with extracted address, in accordance with an embodiment of the present disclosure.

Referring now to FIG. 8A, a first digital label 800A with extracted address, in accordance with some embodiment of the present disclosure is illustrated. FIG. 8A is explained in conjunction with FIGS. 1 and 2. The first label 800A may include identified address-associated non-text object 802. The first label 800A may further include extracted address-associated text objects 804. The address-associated text object 804 may be within a predefined threshold proximity to the address-associated non-text object 802.

Figure 8B:
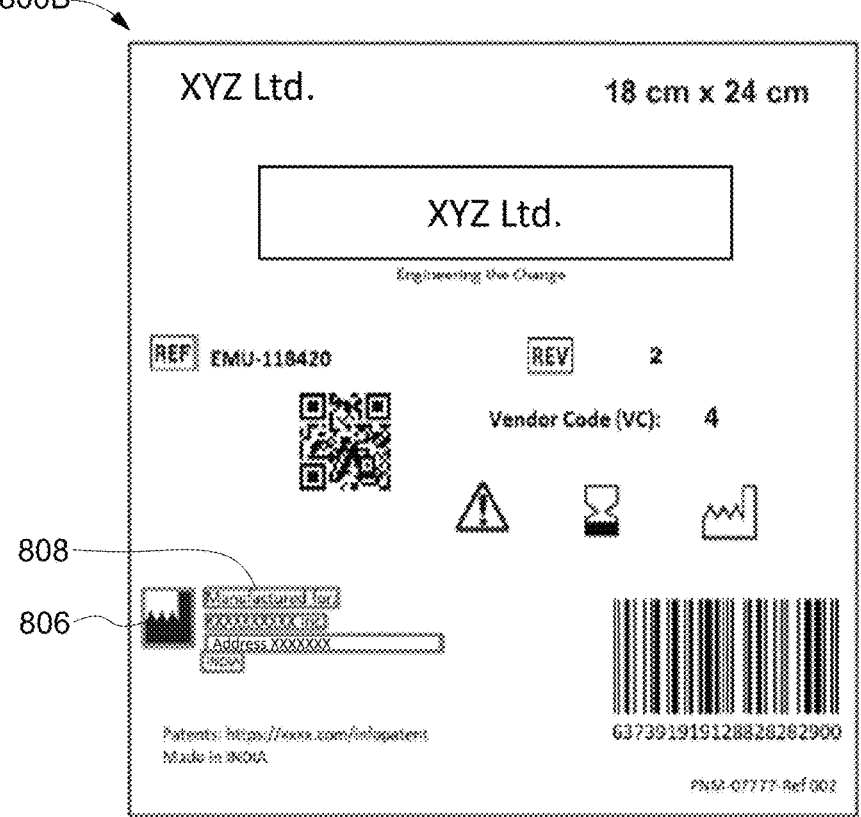
FIG. 8B is an exemplary second digital label with extracted address, in accordance with an embodiment of the present disclosure.

Referring now to FIG. 8B, a second digital label 800B with extracted address, in accordance with some embodiment of the present disclosure is illustrated. FIG. 8B is explained in conjunction with FIGS. 1 and 2. The first label 800B may include identified address-associated non-text object 806. The first label 800B may further include extracted address-associated text objects 808. The address-associated text object 808 may be within a predefined threshold proximity to the address-associated non-text object 806.

Figure 8C:
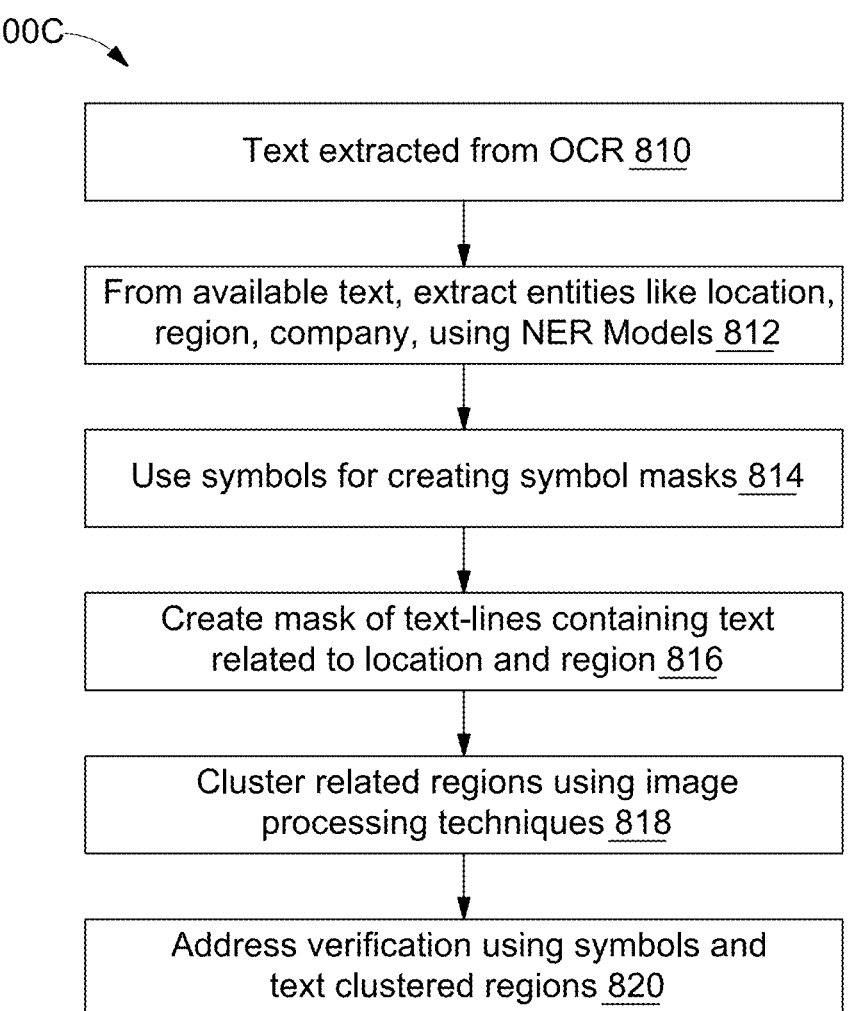
FIG. 8C is a flowchart of a method of extracting address in digital labels, in accordance with an embodiment of the present disclosure.

Referring now to FIG. 8C, a method 800C of extracting address in digital labels is depicted via a flow chart, in accordance with an embodiment of the present disclosure. In an embodiment, method 800C may include a plurality of steps that may be performed by the processor 104 to extract address in at least two digital labels 800A, 800B.

FIG. 8C is explained in conjunction with FIGS. 1 and 2. Each step of the method 800C may be executed by the address extraction module 212, same as the module of the computing device 102.

At step 810, a text may be extracted using optical character recognition (OCR).

Further at step 812, entities may be extracted from the using a named entity recognition (NER) model. The entities may include location, region, company.

Further at step 814, masks may be created for symbols.

Further at step 816, masks may be created of text-lines that may include text corresponding to location and region.

Further at step 818, ROIs may be clustered using image processing technique.

Further at step 820, address may be verified using symbols and text from clustered regions.

Table 8 provided below illustrates an exemplary coordinate of the address in the first digital label 700A and the second digital label 700B.

TABLE 8

| symbol_id | complete_address | x1 | y1 | x2 | y2 |
|---|---|---|---|---|---|
| factory | Manufactured for:XXXXXX Inc., Address XXXXXXX | 744 | 1057 | 1386 | 1172 |
| factory | Manufactured for:XXXXXXX Inc., Address XXXXXXX | 246 | 1020 | 896 | 1133 |

Table 9 provided below illustrates an exemplary comparison between the coordinate of the address in the first digital label 700A and the second digital label 700B.

TABLE 9

| symbol_ref | symbol_mod | add_ref_text | add_mod_text | Flag |
|---|---|---|---|---|
| factory | Factory | Manufactured for:XXXXXX Inc., Address XXXXXXX | Manufactured for:XXXXX Inc., Address XXXXXXX | Address Text Not Matching_Location is not matching |

Figure 9:
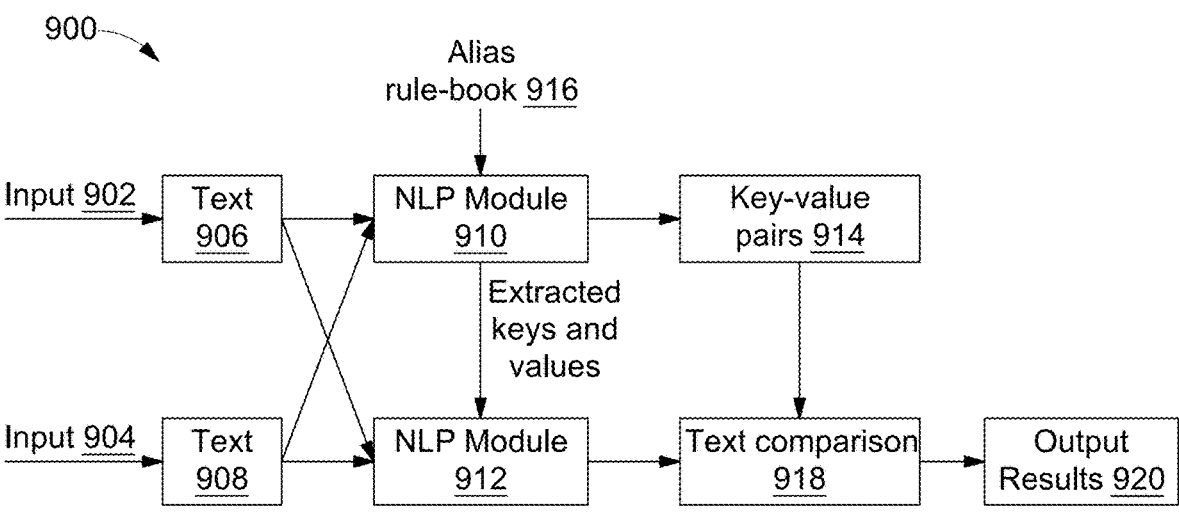
FIG. 9 is a block diagram of an exemplary comparison between text object of the digital labels, in accordance with an embodiment of the present disclosure.

Referring now to FIG. 9, a block diagram 900 of an exemplary comparison between text object of the digital labels, in accordance with an embodiment of the present disclosure is illustrated. FIG. 9 is explained in conjunction with FIGS. 1 and 2. The block diagram 900 may include input 902 and input 904. The input 902 and the input 904 may be extracted text 906 and symbol text 908 from the first digital label 800A and the second label 800B. The input 902 and the input 904 may be input to a natural language processing module 910. The Natural Language Processing (NLP) module 910 may be a key-value extraction model. The extracted key-value pairs from the NLP module 910 may be input to an NLP module 912. The NLP module 912 may be a text comparison module 918. The NLP module 912 may compare the extracted text and symbol text from the first digital label 800A and the second label 800B based on extracted key-value pairs 914. The block diagram 900 may further include an output result 920. The output result 920 may be a comparison report.

Figure 10:
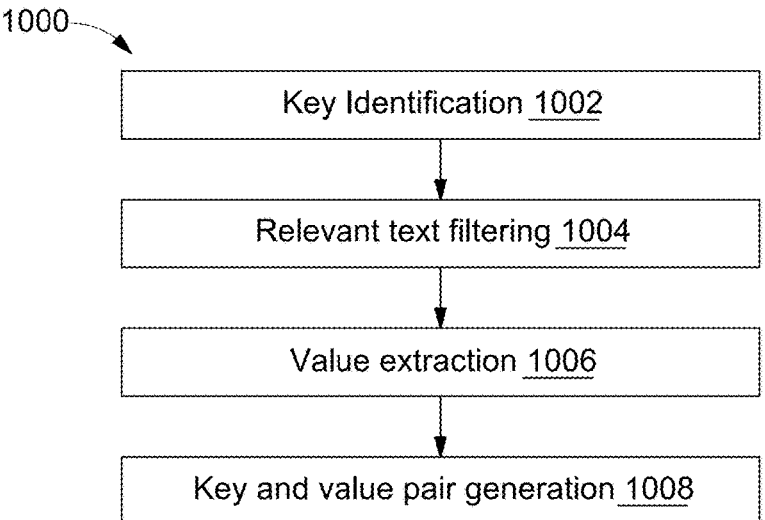
FIG. 10 is a flowchart of a method of key-value pair extraction in digital labels, in accordance with an embodiment of the present disclosure.

Referring now to FIG. 10, a flowchart of a method 1000 of key-value pair extraction in digital labels, in accordance with an embodiment of the present disclosure is illustrated. In an embodiment, method 1000 may include a plurality of steps that may be performed by the processor 104 to extract key-value pair in the at least two digital labels 800A and 800B.

FIG. 10 is explained in conjunction with FIGS. 1 and 2. Each step of method 1000 may be executed by the text comparison module 214, same as the modules of the computing device 102.

At step 1002, keys may be identified based on a search for pre-defined keys from text of the at least two digital labels using aliases from the alias rulebook. The coordinates of the key identified and text of the at least two digital labels may be given as output.

Further, at step 1004, relevant text may be filtered based on the coordinates of the key identified and text of the at least two digital labels.

Further, at step 1006, value may be extracted out of the filtered text using different textual analysis methods.

Further, at step 1008, key-value pairs may be generated based on a condition that if a certain key may not be identified in either text of the at least two digital labels then both key and values may be returned as empty. If keys may be present but suitable value may not be identified, then only key may be returned in the output.

Table 10 provided below illustrates an exemplary extraction of key-value pairs. The table 9 may include key_ref, value_ref, key_mod, value_mod. In an embodiment, the key_ref may be keys present in the first digital label 800A, the value_ref may be values present in the first digital label 800A. The key_mod may be keys present in the second digital label 8001B, the value_mod may be values present in the second digital label 800B.

TABLE 10

| key_ref | value_ref | key_mod | value_mod |
|---|---|---|---|
| Ref | emu-118420 | Ref | emu-118420 |
| rev | 1 | Rev | 2 |
| dom | 10 Jul. 2023 | Dom | |
| use_by_date | 25 Dec. 2024 | use_by_date | |
| vendor code (vc) | 4 | vendor code (vc) | 4 |

Table 11 provided below illustrates an exemplary comparison of key-value pairs between the first digital label 800A and the second digital label 800B

TABLE 11

| key_ref | value_ref | key_mod | value_mod | key_text_match | key_loc_match | key_size_match |
|---|---|---|---|---|---|---|
| ref | emu-118420 | Ref | emu-118420 | Text Unchanged | Location Unchanged | Size Changed |
| rev | 1 | Rev | 2 | Text Unchanged | Location Unchanged | Size Changed |
| dom | 10 Jul. 2023 | Dom | | Text Unchanged | Location Unchanged | Size Unchanged |
| use_by_date | 25 Dec. 2024 | use_by_date | | Text Unchanged | Location Unchanged | Size changed |
| vendor code (vc) | 4 | vendor code (vc) | 4 | Text Unchanged | Location Unchanged | Size Changed |

Figure 11:
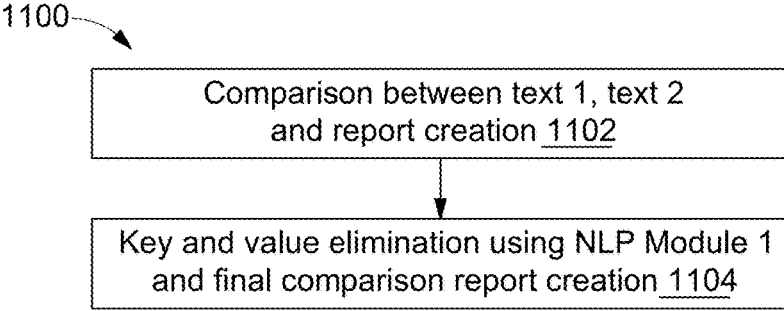
FIG. 11 is a flowchart of a method of comparing text in digital labels, in accordance with an embodiment of the present disclosure.

Referring now to FIG. 11, a flowchart of a method 1100 of comparing text in digital labels, in accordance with an embodiment of the present disclosure. In an embodiment, method 1100 may include a plurality of steps that may be performed by the processor 104 to compare free text in the at least two digital labels 800A and 800B.

FIG. 11 is explained in conjunction with FIGS. 1 and 2. Each step of the method 1100 may be executed by the text comparison module 214, same as the modules of the computing device 102.

At step 1102, a comparison report may be created based on a comparison between the text data of the first digital label 800A and the second digital label 800B.

Further, at step 1104, key and value may be eliminated using the NLP module 1 and a final comparison report may be created.

Table 12 provided below illustrates an exemplary comparison of free-text.

TABLE 12

| reference_image_text | modified_image_text | del_x1 | del_x2 | del_y1 | del_y2 | location_match | text_match |
|---|---|---|---|---|---|---|---|
| 18 cm × 24 cm | 18 cm × 24 cm | −1 | −1 | −1 | −1 | Location Unchanged | Text Unchanged |
| engineering the change | engineering the change | 0 | 2 | 24 | 0 | Location Unchanged | Text Unchanged |
| vendor code (vc | vendor code (vc | 563 | 564 | 88 | 54 | Location Unchanged | Text Unchanged |
| manufactured for | manufactured for | 497 | 498 | 70 | 40 | Location Unchanged | Text Unchanged |
| xxxxxxxxxxxx inc, | xxxxxxxxxxxx inc, | 495 | 501 | 66 | 42 | Location Unchanged | Text Unchanged |
| 17 apple road, honey street, ct 87654 indi patent | 17 apple road, honey street, ct 87654 indi patent | 501 | 490 | 70 | 39 | Location Unchanged | Text Unchanged |
| https.xxxx.com infopatent | no match found | −1 | −1 | −1 | −1 | Location Unchanged | Text Unchanged |
| made in india | made in india | 647 | 645 | 22 | 2 | Location Unchanged | Text Unchanged |
| pnm-07777-ref 002 | pnm-07777-ref 002 | 12 | 12 | 38 | 13 | Location Unchanged | Text Unchanged |

Figure 12A:
FIG. 12A is an exemplary first digital label with decoded barcodes, QR codes and Data matrix, in accordance with an embodiment of the present disclosure.

Referring now to FIG. 12A, a first digital label 1200A with decoded barcodes, QR codes and Data matrix, in accordance with an embodiment of the present disclosure is illustrated. FIG. 12A is explained in conjunction with FIGS. 1 and 2. The first digital label 1200A may include decoded data from an object in each of the first digital label 1200A when the object category may be one of the barcodes, the data matrix, or the QR-codes.

Table 13 provided below illustrates an exemplary decoded barcode, QR codes and Data matrix in the first digital label 1200A.

TABLE 13

| | x1 | y1 | x2 | y2 | Score | Type | Symbol_Information |
|---|---|---|---|---|---|---|---|
| 0 | 276 | 1133 | 664 | 1359 | 0.967837 | BARCODE | 8185517317659 |
| 1 | 557 | 1015 | 658 | 1119 | 0.962363 | DATAMATRIX/ QR-CODE | 15697830.pdf |

Figure 12B:
FIG. 12B is an exemplary second digital label with decoded barcodes, QR codes and Data matrix, in accordance with an embodiment of the present disclosure.

Referring now to FIG. 12B, a second digital label 1200B with decoded barcodes, QR codes and Data matrix, in accordance with an embodiment of the present disclosure is illustrated. FIG. 12B is explained in conjunction with FIGS. 1 and 2. The second digital label 1200B may include decoded data from an object in each of the first digital label 1200B when the object category may be one of the barcodes, the data matrix, or the QR-codes.

Table 15 provided below illustrates an exemplary decoded barcode, QR codes and Data matrix in the second digital label 1200B.

TABLE 14

|   | x1 | y1 | x2 | y2 | Score | Type | Symbol_Information |
|---|------|------|------|------|----------|----------------------|--------------------|
| 0 | 504  | 716  | 664  | 877  | 0.974015 | DATAMATRIX/ QR-CODE | 15697830.pdf |
| 1 | 1020 | 1037 | 1419 | 1265 | 0.971287 | BARCODE | 8185517317659 |

Table 16 provided below illustrates an exemplary comparison of decoded barcode, QR codes and Data matrix of the first digital label 1200A and the second digital label 1200B.

TABLE 15

|   | x1 | y1 | x2 | y2 | Type | Symbol_Information | Value_Matching_Status | Location_Status |
|---|-----|------|-----|------|----------------------|--------------------|-----------------------|-------------------|
| 0 | 276 | 1133 | 664 | 1359 | BARCODE | 8185517317659 | Matching | Location Changed |
| 1 | 557 | 1015 | 658 | 1119 | DATAMATRIX/ QR-CODE | 15697830.pdf | Matching | Location Changed |

Thus, the disclosed method and system try to overcome the technical problem of comparing digital labels.

As will be appreciated by those skilled in the art, the techniques described in the various embodiments discussed above are not routine, or conventional, or well understood in the art. The techniques discussed above provide for comparing digital labels.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps bring an improvement in the functioning of the device itself as the claimed steps provide a technical solution to a technical problem.

The specification has described method and system for comparing digital labels. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope of disclosed embodiments being indicated by the following claims.

What is claimed is:

1. A method of comparing at least two digital labels, the method comprising:

detecting, by a processor, a set of regions of interest (ROIs) corresponding to a set of objects in each of the at least two digital labels using a first Machine Learning (ML)/Deep Learning (DL) model;

classifying, by the processor, each of the set of objects into one of a set of text objects or a set of non-text objects using a second ML/DL model;

for each text object of the set of text objects, extracting, by the processor, one or more key-value pairs of one or more attributes from the text object using a first Natural Language Processing (NLP) model; and comparing, by the processor, the one or more key-value pairs and text data corresponding to the text object of the at least two digital labels using a second NLP model;

for each non-text object of the set of non-text objects, categorizing, by the processor, the non-text object into an object category from a set of object categories using a third ML/DL model; and comparing, by the processor, an ROI of the non-text object based on positional information and the object category in the at least two digital labels; and generating, by the processor, an output report based on the comparison of the text data and the comparison of the ROI of each of the set of similar type of objects in the at least two digital labels.

2. The method of claim 1, further comprising detecting, by the processor, a boundary of each of the at least two digital labels using an image processing technique.

3. The method of claim 1, wherein the set of objects comprises symbols, logos, barcodes, QR-codes, data matrix, and text data, and wherein the set of object categories comprises symbols, logos, barcodes, data matrix, and QR-codes.

4. The method of claim 3, further comprising determining, by the processor, decoded data from an object in each of the at least two digital labels when the object category is one of the Barcodes, the Data Matrix, or the QR-codes.

5. The method of claim 1, further comprising:

for each of the at least two digital labels, identifying, by the processor, address-associated non-text objects from the set of non-text objects;

extracting, by the processor, address-associated text objects from the set of text objects using a Named Entity Recognition (NER) model, wherein the address-associated text objects are within a predefined threshold proximity to the address-associated non-text objects;

creating, by the processor, masks corresponding to the address-associated text objects and address-associated non-text objects;

clustering, by the processor, address-associated ROIs based on the masks using image processing techniques; and extracting, by the processor, address information from the address-associated ROIs using a third NLP model.

6. The method of claim 1, wherein extracting one or more key-value pairs further comprises:

for each of the at least two digital labels, identifying, by the processor, one or more keys from the text object and coordinates corresponding to each of the one or more keys using the first NLP model based on aliases corresponding to the one or more attributes;

extracting, by the processor, one or more values associated with the one or more keys using the first NLP model; and generating, by the processor, the one or more key-value pairs of attributes from the text object.

7. A system for comparing at least two digital labels, the system comprising:

a processor; and a memory communicably coupled to the processor, wherein the memory stores processor-executable instructions, which, on execution, cause the processor to:

detect a set of regions of interest (ROIs) corresponding to a set of objects in each of the at least two digital labels using a first Machine Learning (ML)/Deep Learning (DL) model;

classify each of the set of objects into one of a set of text objects or a set of non-text objects using a second ML/DL model;

for each text object of the set of text objects, extract one or more key-value pairs of one or more attributes from the text object using a first Natural Language Processing (NLP) model; and compare the one or more key-value pairs and text data corresponding to the text object of the at least two digital labels using a second NLP model;

for each non-text object of the set of non-text objects, categorize the non-text object into an object category from a set of object categories using a third ML/DL model; and compare an ROI of the non-text object based on positional information and the object category in the at least two digital labels; and generate an output report based on the comparison of the text data and the comparison of the ROI of each of the set of similar type of objects in the at least two digital labels.

8. The system of claim 7, wherein the processor-executable instructions, on execution, cause the processor to detect a boundary of each of the at least two digital labels using an image processing technique.

9. The system of claim 7, wherein the set of objects comprises symbols, logos, barcodes, QR-codes, data matrix, and text data, and wherein the set of object categories comprises symbols, logos, barcodes, data matrix, and QR-codes.

10. The system of claim 9, wherein the processor-executable instructions, on execution, cause the processor to determine decoded data from an object in each of the at least two digital labels when the object category is one of the Barcodes, the Data Matrix, or the QR-codes.

11. The system of claim 7, wherein the processor-executable instructions, on execution, cause the processor to:

for each of the at least two digital labels, identify address-associated non-text objects from the set of non-text objects;

extract address-associated text objects from the set of text objects using a Named Entity Recognition (NER) model, wherein the address-associated text objects are within a predefined threshold proximity to the address-associated non-text objects;

create masks corresponding to the address-associated text objects and address-associated non-text objects;

cluster address-associated ROIs based on the masks using image processing techniques; and extract address information from the address-associated ROIs using a third NLP model.

12. The system of claim 7, wherein to extract one or more key-value pairs, the processor-executable instructions, on execution, cause the processor to:

for each of the at least two digital labels, identify one or more keys from the text object and coordinates corresponding to each of the one or more keys using the first NLP model based on aliases corresponding to the one or more attributes;

extract one or more values associated with the one or more keys using an NLP model text analysis technique; and generate the one or more key-value pairs of attributes from the text object.

13. A non-transitory computer-readable medium storing computer-executable instructions for comparing at least two digital labels, the computer-executable instructions configured for:

detecting a set of regions of interest (ROIs) corresponding to a set of objects in each of the at least two digital labels using a first Machine Learning (ML)/Deep Learning (DL) model;

classifying each of the set of objects into one of a set of text objects or a set of non-text objects using a second ML/DL model;

for each text object of the set of text objects, extracting one or more key-value pairs of one or more attributes from the text object using a first Natural Language Processing (NLP) model; and comparing the one or more key-value pairs and text data corresponding to the text object of the at least two digital labels using a second NLP model;

for each non-text object of the set of non-text objects, categorizing, by the processor, the non-text object into an object category from a set of object categories using a third ML/DL model; and comparing, by the processor, an ROI of the non-text object based on positional information and the object category in the at least two digital labels; and generating, by the processor, an output report based on the comparison of the text data and the comparison of the ROI of each of the set of similar type of objects in the at least two digital labels.

14. The non-transitory computer-readable medium of claim 13, the computer-executable instructions are configured for:

detecting a boundary of each of the at least two digital labels using an image processing technique.

15. The non-transitory computer-readable medium of claim 13, wherein the set of objects comprises symbols, logos, barcodes, QR-codes, data matrix, and text data, and wherein the set of object categories comprises symbols, logos, barcodes, data matrix, and QR-codes.

16. The non-transitory computer-readable medium of claim 15, the computer-executable instructions are configured for:

determining decoded data from an object in each of the at least two digital labels when the object category is one of the Barcodes, the Data Matrix, or the QR-codes.

17. The non-transitory computer-readable medium of claim 13, the computer-executable instructions are configured for:

for each of the at least two digital labels, identifying address-associated non-text objects from the set of non-text objects;

extracting address-associated text objects from the set of text objects using a Named Entity Recognition (NER) model, wherein the address-associated text objects are within a predefined threshold proximity to the address-associated non-text objects;

creating masks corresponding to the address-associated text objects and address-associated non-text objects;

clustering address-associated ROIs based on the masks using image processing techniques; and extracting address information from the address-associated ROIs using a third NLP model.

18. The non-transitory computer-readable medium of claim 13, the computer-executable instructions are configured for:

for each of the at least two digital labels, identifying one or more keys from the text object and coordinates corresponding to each of the one or more keys using the first NLP model based on aliases corresponding to the one or more attributes;

extracting one or more values associated with the one or more keys using the first NLP model; and generating the one or more key-value pairs of attributes from the text object.

* * * * *